United States Patent Office 3,146,057
Patented Aug. 25, 1964

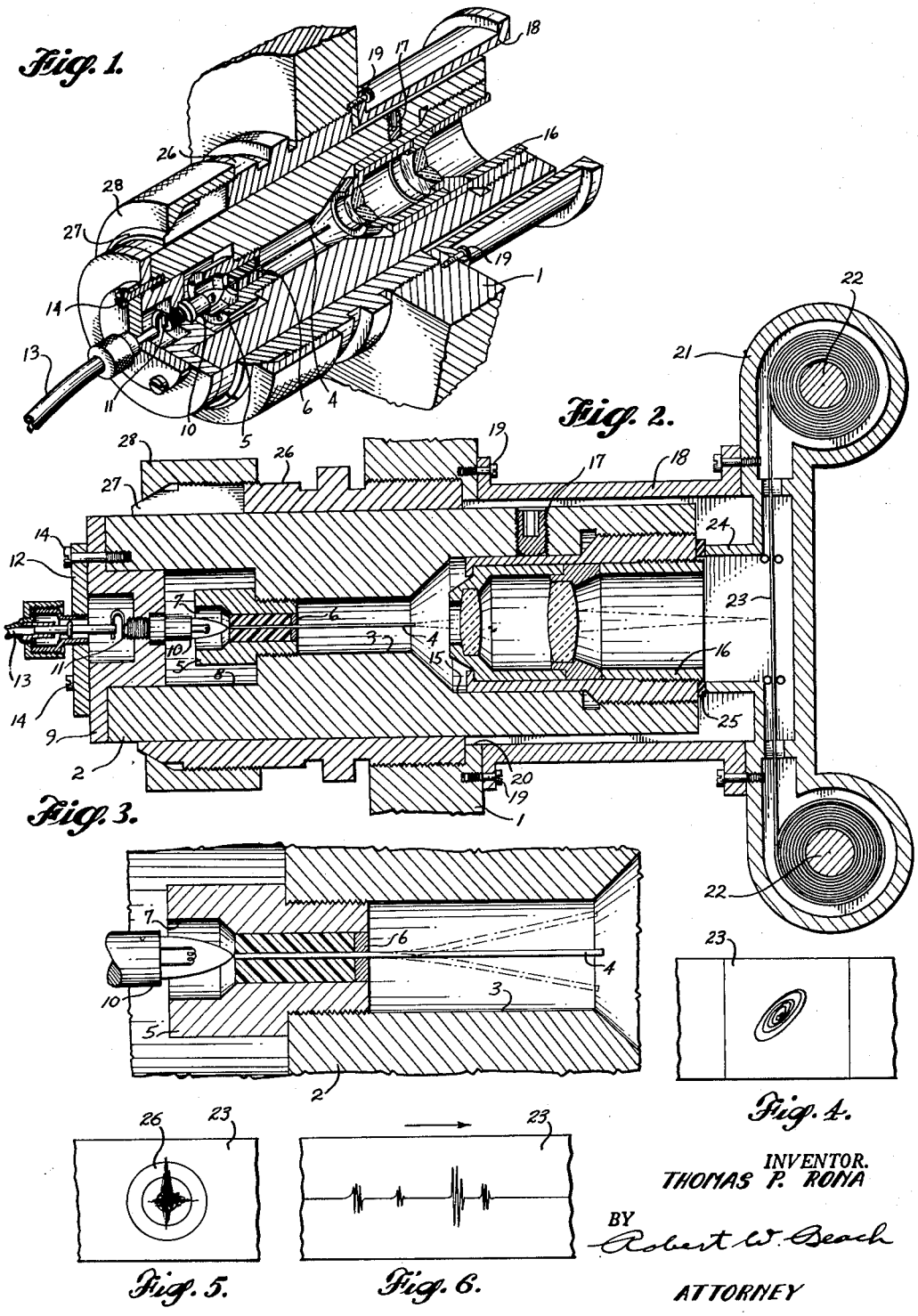

3,146,057
VIBRATILE TRANSPARENT FILAMENT
ACCELEROMETER
Thomas P. Rona, 614 Hazel St., Kent, Wash.
Filed May 8, 1961, Ser. No. 108,458
6 Claims. (Cl. 346—108)

The present invention relates to an accelerometer capable of indicating an abrupt motion disturbance in a wide variety of applications by the pattern of light transmitted axially through a transparent filament.

A principal object is to provide such an accelerometer which is very light, small and compact, yet which can produce an indication which is readily visible or can be recorded easily by very simple apparatus.

A further object is to provide mechanism associated with the accelerometer which can make a record of movement of the acceleration sensitive element in various ways, such as on a stationary film, or on a moving film or in a numerical record.

It is also an object to provide an accelerometer sensitive to different types of disturbance such as vibration, shock, impact, static electricity, or magnetic forces.

Such objects can be accomplished by an accelerometer in which a vibratile transparent filament is supported in cantilever fashion having its supported end exposed to a source of light in close proximity to it for projecting light axially through the filament irrespective of the deflection of its free end. The light transmitted by the filament is directed through a magnifying and focusing lens system, or objective onto an indicating or recording surface, such as a ground glass for observation or a film or photoelectric device for recording.

FIGURE 1 is a top perspective of the accelerometer with the near quadrant broken away to reveal its internal construction.

FIGURE 2 is an enlarged central longitudinal section through the accelerometer.

FIGURE 3 is an enlarged fragmentary longitudinal section through the filament-supporting and illuminating portion of the accelerometer.

FIGURES 4, 5 and 6 illustrate sections of film bearing representative traces made by light emitted from the accelerometer filament.

From the drawing it is difficult to appreciate the small size of the accelerometer, but it should be kept in mind that the entire length of the accelerometer body shown in FIGURE 1 would be only about two and one-half inches and the outside diameter of the assembly shown in that figure would be about one inch. This accelerometer assembly conveniently can be mounted in a threaded aperture in a mounting wall 1 so that it can be removed and replaced readily. The assembly thus mounted in the wall will enclose completely the sensitive, or fragile, parts of the accelerometer so that they will be protected from damage. The accelerometer assembly may, however, be taken apart readily for repair or replacement of parts.

The accelerometer assembly includes a barrel 2 having a thick wall as compared to the entire size of the accelerometer assembly. A stepped bore extends through this barrel which has a central portion 3 of smallest diameter forming a chamber in which the delicate transparent filament 4 is received. This filament may have a total length of approximately three-quarters of an inch with approximately two-thirds of its length being free and supported in cantilever fashion by the other third of the filament length being secured in a mounting plug 5. The exterior of this plug is stepped and the smaller portion adjacent to the free end of the filament is threaded to screw into a complementally threaded end of the central section 3 of the bore through the barrel 2.

The vibratile linear filament 4 is of bendable and resilient, in other words limber, transparent material, as indicated in FIGURE 3, having a diameter of the order of one-thousandth of an inch and having light refraction characteristics such that a beam of light will be emitted from one end when the opposite end is illuminated irrespective of the amount or nature of the deflection of parts of the filament between its ends. Such light-conducting filament may be a single glass fibre, for example. The core of the filament will have a high index of refraction and the surface of the filament will have a low index of refraction so that light is trapped in the filament instead of being emitted along its length. The supported end portion of the filament can be embedded in wax or resin 6 in the bore of the plug 5, but the supported end of such filament will extend completely through the wax body so that the end of the filament will be exposed in the cavity 7 in the base of the plug communicating with the platsic filled bore in which the filament is mounted. Care should be taken in mounting the filament in the plug bore so that, as shown in FIGURES 2 and 3, the free end portion of the filament when at rest will extend substantially coaxially through the bore of chamber 3.

The base of the plug 5 is received in an enlarged portion 8 of the bore through the barrel extending from the smaller central portion of the bore to one end of the barrel. This enlarged portion of the barrel is closed by the cover 9 having a boss fitting within such enlarged bore portion. This boss has a central tapped aperture constituting the socket for a miniature light bulb 10 having a threaded base adapted to be screwed into such socket. The length of the enlarged bore portion 8, the axial extent of the boss on cover 9 and the axial extent of the cavity 7 in plug 5, are proportioned relative to the length of the light bulb 10 so that, as shown best in FIGURE 3, the end of the light bulb will be in very close proximity to the supported end of the filament 4. When the light bulb is energized, therefore, a maximum amount of light will be projected into the supported end of the filament.

The light bulb 10 may be of the center contact type so that one circuit connection will be to the barrel assembly generally. The other contact 11 of spring strip type can be mounted suitably on plate 12 and connected to a wire 13. Such plate and the cover 9 can be secured to the end of the barrel by bolts 14 screwed into tapped holes in the end of barrel 2.

In the end of the barrel 2 opposite the light source, the bore through the barrel is enlarged to form the cavity 15 having an internally threaded portion adjacent to the end of the barrel. Into this cavity is screwed an objective 16 providing a lens system which will magnify and focus the beam of light emitted from the free end of the filament 4. Such objective can be secured in place in the barrel by the recessed set screw 17 received in a threaded aperture in the barrel 2 extending transversely of its length and located farther from the open end of cavity 15 than the extent of the threaded portion of such cavity.

The barrel 2 must be mounted in proper relationship to an indicating or recording surface on which the objective 16 focuses the light beam emitted from the filament 4. Consequently, it is convenient to mount both the barrel and the support for the indicating or recording surface in proper relationship to the mounting wall 1. A tube 18 secured to one face of the wall by screws 19 threaded into tapped holes in the wall may be supported in alignment with an aperture 20 extending through the wall to receive the accelerometer assembly. On this tube is mounted the desired indicating or recording medium, such as a ground glass or a film to receive light from the objective 16.

As representative of a film holder as typical of a recording medium, the film case 21 is shown mounted on the end of tube 18 remote from the wall 1. Opposite ends of this case provide chambers receiving strip film mounting spools 22. The film strip 23 extends between these spools across the aperture within the flange 24 projecting from one side of the casing into the tube 18 coaxial with it and having a cushion ring 25 covering its end. The internal diameter of this flange is appropriate to fit the exposed end of the objective 16.

A clamping sleeve 26 is screwed into a threaded portion of aperture 20 in mounting plate 1 at the side of this plate opposite that from which tube 18 projects. The internal diameter of this clamping sleeve corresponds approximately to the external diameter of the barrel 2, so that the barrel will fit slidably within the sleeve. The end of this sleeve remote from wall 1 has in it several deep notches extending inward from its end and the end of the sleeve is formed with a bevel 27. A portion of this sleeve adjacent to the end is threaded externally to receive a nut 28 which has an inwardly projecting end portion tapered internally complementally to the bevel 27. The barrel 2 is slid into the sleeve 26 while the nut 28 is in loosened condition. When the barrel has reached the position shown in FIGURE 2 in which the objective end is in engagement with the cushion ring 25 of the film holder, the nut 28 is tightened so that its internal inclined surface wedges the bevel 27 inward to spring the notched end of the sleeve into firm clamping engagement with the barrel to hold it in this position.

The mounting wall 1 may be part of an object the vibration of which is to be measured, or which article is to be subjected to an impact or shock. Such vibration, impact, or shock to which the wall 1 is subjected will be transmitted to the clamping sleeve, barrel, plug 5, objective 16 and film strip 23 so as to produce a deflection of such components relative to the free end of the filament 4, which free end tends to maintain a stable condition by reason of its inertia. As shown in FIGURE 3 bending of the limber filament will occur principally adjacent to the portion of the filament embedded in the plastic material 6. The direction and amplitude of filament deflection will depend upon the structural characteristics of the filament and the severity of the disturbing force, establishing the extent and abruptness of the accelerometer body displacement. Because of the resiliency of the filament its free end will vibrate to opposite sides of its central position shown in FIGURE 3. The vibrating action of the filament may occur in a plane or the free end of the filament may rotate in a closed path, such as circular or elliptical. For certain applications the filament should have such energy-dissipating characteristics that the vibrations or rotary movement of the filament will be damped shortly after the disturbing force ceases. Coating the filament with grease, for example, will increase the rate of energy dissipation and decrease the number of vibrations.

If the vibration of the filament 4 occurred in a single plane, the light beam emitted from its free end after being magnified and focused by the objective 16 will produce a rectilinear trace on the film 23 or ground glass observing surface. In some instances it may not be necessary to determine a particular pattern of vibration, it being sufficient simply to know the general type of vibration or the maximum displacement of the filament 4 which has occurred as a result of an impact which will indicate the severity of the shock to which the accelerometer has been subjected.

FIGURES 4, 5 and 6 illustrate somewhat diagrammatically different types of trace which may be obtained in different types of recording installations depending upon the type of information desired. In FIGURE 4 a portion of the film 23 has been placed in registry with the objective 16 of the accelerometer and the mounting wall has been subjected to the influence of vibration. The pattern traced by the point of light on the film indicates the nature of the particular vibration pattern. The pattern illustrated indicates that the vibratory action was in at least two dimensions and that the vibration in one direction was greater than the amplitude of such vibration in a perpendicular direction so that the free end of the filament was moved in a generally elliptical path.

In FIGURE 5 a portion of film 23 is shown as having on it a reference bull's-eye, the center of which should be located in registry with the center of the objective 16 so that when the filament 4 is at rest a spot of light would be projected precisely at the center of the bull's-eye. The accelerometer could then be mounted in a wall of a shipping container, for example, and oriented so that if the shipping container were jolted it would cause the filament to be deflected. Thus, for example, if the container were being shipped by rail the principal jolts would occur lengthwise of the train and no appreciable jolts vertically would be expected so that the accelerometer would be mounted with the filament 4 extending vertically to detect horizontal jolts of the container.

If the container were being shipped by truck, on the contrary, the jolting would be expected to be principally vertically and fore and aft with virtually no sidewise jolting. In that case the accelerometer would be placed so that the filament 4 extended transversely of the truck in a horizontal direction. Vertical jolts of the truck or trailer would then cause up and down movement relative to the free end of the filament which would tend to remain stationary because of its inertia, whereas sudden accelerations or decelerations of the truck would cause horizontal movement relative to the free end of the filament.

As the free end of the filament and the filament support are displaced relatively in a manner indicated in broken lines in FIGURE 3, the light beam projected from the filament through the objective would be displaced from the center of the bull's-eye 26 because the bull's-eye would be moved with the filament support, and would expose portions of the film displaced from the center of the bull's-eye corresponding to the magnitude of the relative displacement of the filament support and its free end. Since, under these circumstances the recording would continue over an extended period of time, such as hours or even days, the intensity of the film exposure in various portions of the bull's-eye would indicate the frequency of jolting in general as well as the severity of the jolting indicated by the extent of exposure of the film outwardly from the center of the bull's-eye.

FIGURE 6 illustrates another type of recording of a particular type of vibration. In this instance one or the other of the spindles 22 will be rotated to wind the film onto that spindle and pull it from the other spindle. The film will thus be moved progressively across the opening in registry with the objective 16 so as to produce a moving record of the vibration to which the accelerometer is subjected. In this instance the accelerometer would be mounted so that the vibration to be indicated would be in a direction transversely of the direction of film movement. FIGURE 6 then indicates that the accelerometer has been subjected to periodic vibrations and the intensity or amplitude of such vibrations transversely of the direction of movement of the film and the duration of each period of vibration is clearly indicated. Such duration can be determined not only relatively but in actual time units by reference to the known speed of travel of the film in the direction indicated by the arrow in FIGURE 6.

If it should be desirable to render the filament 4 sensitive to accelerations in only one plane, it may be bonded to a thin strip of foil disposed in a plane perpendicular to the plane in which it is desired that the free end of the filament and the filament support be displaced relatively. The beam effect of such foil strip will prevent bending of the filament parallel to its plane without appreciably deterring relative swinging of the free end of the filament and the filament support in a plane perpendicular to the plane of such foil strip. This type of filament structure might be desirable in particular for recording vibrations in only one plane on a moving film such as described in connection with FIGURE 6.

While the structure described has been discussed for use as an accelerometer, the filament 4 being displaced relative to its support by its inertia when the mounting wall 1 is shifted suddenly, such a vibratile transparent filament instrument may be used to record variations in a magnetic field or an electrostatic field. For such use at least the tip portions of the filament would be coated with suitable metallic material which would be influenced by a magnetic or an electrostatic field. Depending upon the disturbance in field to be indicated, the type of coating would be selected so that the filament 4 would be deflected in proportion to the magnetic or electrostatic field disturbance instead of as a result of the inertia of the filament following physical displacement of the mounting wall 1. The resulting movement of the filament 4 could be recorded in the manner described above. By the use of this expedient variations in electric current or voltage creating the change in magnetic field, for example, could be measured.

Also, while recording of the filament deflection on film has been described, instrumentation could be provided to indicate the degree of deflection of the filament. For this purpose a photo-electric cell could be substituted for the film 23 and it could be connected to a galvanometer or other type of indicator to record the effect of the moving light beam on the photo-electric cell.

While only a single filament has been shown in the drawings, several filaments of different lengths could be mounted side-by-side in the same mounting. These filaments would have different degrees of inertia and natural vibration frequencies so that they would react in different ways to mechanical or magnetic disturbing influences. Such an arrangement is particularly useful for analyzing the nature of the acceleration resulting from subjecting the mounting wall 1 to mechanical shock. If the filaments are all mounted in the same plane and the mounting wall is subjected to a shock in a direction transversely of such plane, the motion response of the several filaments will provide an impact spectrum of the acceleration imparted to the mounting wall.

I claim as my invention:

1. Disturbance indicating mechanism comprising a casing having a bore therethrough, a vibratile light-conductive limber filament received in said bore and extending lengthwise thereof, opaque filament mounting means secured in such bore, mounting said filament in cantilever fashion by one end portion which extends completely through said mounting means, for relative swinging of the free end portion of said filament and said casing resulting from the inertia of said filament upon acceleration of said casing, a light source at the side of said filament mounting means remote from the free end portion of said filament and operable to project light into the end of the end portion of said filament mounted by said mounting means, and light-sensitive indicating means carried by said casing in registry with said bore and located at the side of said filament mounting means remote from said light source for reception of light transmitted from said light source through said filament for producing a trace on said indicating means to indicate relative swinging of the free end of said filament and said casing.

2. The disturbance indicating mechanism defined in claim 1, in which the light-sensitive indicating means is a film, and film-supporting means on the casing mounting said film for movement across the end of the casing bore transversely thereof to expose successive portions of said film lengthwise thereof to light transmitted through the light-conductive filament.

3. Disturbance indicating mechanism comprising a vibratile light-conductive limber filament, supporting means mounting said filament in cantilever fashion by one end portion, with the end of such end portion uncovered, for relative swinging of the free end portion of said filament and said supporting means resulting from the inertia of said filament upon acceleration of said supporting means, a light source located adjacent to the mounted end of said filament and operable to project light into such mounted filament end for transmission through said filament, and light-sensitive indicating means movable conjointly with said supporting means, disposed to receive light transmitted through said filament and opoperable to indicate relative swinging of said filament's free end portion and said supporting means.

4. The disturbance indicating mechanism defined in claim 3, in which the light-sensitive indicating means is a film.

5. The disturbance indicating mechanism defined in claim 3, in which the light-sensitive indicating means are photo-sensitive electronic means.

6. Disturbance indicating mechanism comprising a vibratile light-conductive limber filament, supporting means mounting said filament in cantilever fashion by one end portion, with the end of such end portion uncovered, for relative swinging of the free end portion of said filament and said supporting means resulting from the inertia of said filament upon acceleration of said supporting means, a light source located adjacent to the mounted end of said filament and operable to project light into such mounted filament end for transmission through said filament, light-sensitive indicating means movable conjointly with said supporting means and spaced from the free end portion of said filament, and an objective located between the free end portion of said filament and said light-sensitive indicating means, movable conjointly with said supporting means and said light-sensitive indicating means and operable to receive light from the free end of said filament and to transmit such light to said light-sensitive indicating means in a movement pattern amplified as compared to the relative movement between said supporting means and the free end portion of said filament.

References Cited in the file of this patent

UNITED STATES PATENTS

| | | |
|---|---|---|
| 1,597,487 | St. Clair | Aug. 24, 1926 |
| 1,663,308 | Jenkins | May 20, 1928 |
| 1,757,800 | Henderson | May 6, 1930 |
| 2,301,396 | Graf | Nov. 10, 1942 |
| 2,313,310 | Arnold | Mar. 9, 1943 |
| 2,428,671 | Kent et al. | Oct. 7, 1947 |
| 2,429,094 | Kent et al. | Oct. 14, 1947 |
| 2,445,304 | Grace | July 23, 1948 |
| 2,447,863 | Kent et al. | Aug. 24, 1948 |
| 2,514,153 | Dickerson | July 4, 1950 |
| 2,514,315 | Dickerson | July 4, 1950 |
| 2,695,211 | Guthvein et al. | Nov. 23, 1954 |
| 2,900,817 | Grindle et al. | Aug. 25, 1959 |
| 2,906,117 | Kennard | Sept. 29, 1959 |
| 2,982,175 | Eisler | May 2, 1961 |